United States Patent Office 3,535,246
Patented Oct. 20, 1970

3,535,246
HEAT PRODUCING COMPOSITION AND METHOD OF EMPLOYMENT
Charles J. Crowell, Jr., Oxnard, Calif., assignor to the United States of America as represented by the Secretary of the Navy
No Drawing. Filed Mar. 21, 1968, Ser. No. 714,779
Int. Cl. C09k 3/02, 3/18
U.S. Cl. 252—70                                4 Claims

ABSTRACT OF THE DISCLOSURE

A non-toxic cream having a specified chemical component which reacts exothermally upon the addition of water to provide heat for warming inanimate articles or living bodies subject to a cold environment such as immersion in water and the like. The chemical heat generating component includes alloys of lithium and aluminum, lithium and magnesium, aluminum and magnesium or powdered magnesium. The cream is spread directly upon the object to be warmed where environmental water initiates the warming reaction or the cream may be placed within a protective suit such as that worn by a diver or flyer with water admitted in controlled amounts to create the heat producing exothermic reaction.

---

The invention described herein may be manufactured and used by or for the Government of the United States of America for governmental purposes without the payment of any royalties thereon or therefor.

BACKGROUND OF THE INVENTION

Field of the invention

The present invention relates generally to means for heating objects or persons in cold environments. The invention more particularly relates to chemicals which react exothermally in the presence of water to supply a suitable heat for warming divers, downed flyers or any other object when subjected to cold environments.

Description of the prior art

Various electrical, chemical and physical devices have been employed for supplying heat to inanimate objects and to the human body including divers, downed flyers, arctic explorers, instrument packs, etc. However, the devices of the prior art have not been widely used or generally accepted because they are unduly bulky, cumbersome, heavy and unreliable in operation.

A related disclosure is shown in copending U.S. patent application S.N. 583,501, filed Sept. 29, 1966, now Pat. No. 3,461,073, in which the present applicant is a co-applicant. Although the theory in the earlier filed application is similar, the novel compositions of the present application create a heat of reaction at least six times as great as that of any of the compositions disclosed in the earlier filed application and as such are believed to be a patentable improvement in the art.

It is therefore an object of the present invention to provide new compositions of matter which react exothermally in the presence of water.

It is an additional object of the present invention to provide new exothermic compositions which may be used adjacent an object to release heat and warm the object upon the gradual addition of water to the composition.

A further object of the present invention is to provide new exothermic compositions which are economical and highly reliable in operation.

Other objects, advantages, and novel features of the invention will become apparent from the following detailed description.

SUMMARY OF THE INVENTION

Broadly, this invention involves new compositions of matter comprising an admixture of about 30 to 70 percent by weight of heat generating substances which react with water to produce heat, from about 15 to 20 percent by weight of an anhydride or, if desired, a salt of a strong acid and weak base may be employed, from about 0.1 to 6.0 percent by weight of a high molecular weight alcohol or polyol, from about 1.0 to 10 percent by weight of an arabin-type gum material, from about 0.1 to 2.0 percent by weight of a surface active agent and the balance of 100 percent by weight of an oleaginous substance.

The heat generating components are selected from the group consisting of a lithium-aluminum alloy, a lithium-magnesium alloy, an aluminum-magnesium alloy and powdered magnesium. Preferably a substance is present in the composition which complements or aids the heat generating component. This may include acetic anhydride or a salt of a strong acid and a weak base including but not limited to aluminum sulfate, ammonium sulfate, ferric sulfate and ferric ammonium sulfate.

Acetic anhydride is the preferred constituent because it tends to provide a relatively water free composition until water is actually required in the production of heat. This will increase both the efficiency of the reaction and the quantity of heat obtained. The strong acid and weak base salts, if utilized, may be employed in combination with or without the anhydride. They provide an admixture of solid constituents prior to the admission of water and as such are much more easily handled.

The heavy alcohols and polyols or combination thereof utilized normally have a molecular weight in the range of about 4000 to 9000 and serve to make the composition more compatible with an aqueous medium. For example, an alcohol with a molecular weight of about 4000 would render the composition less compatible with water than an alcohol with a molecular weight of about 9000. For this reason, a combination of alcohols and/or polyols including arabin-type gums is usually employed to suitably control the moisture compatibility of the composition. The surface active agents include soaps, detergents, wetting agents, etc. which are included to permit a slow addition continuously or in small increments of an aqueous medium to the composition for continuously or intermittently producing desired amounts of heat. The oleaginous substance may include mineral oil, vegetable oil, wax gum, resins and synthetic oil, gums or resins. The amount of oleaginous substances is determined by the consistency desired in the composition.

The resulting creamy composition is spread directly on the object to be warmed or it may be introduced between the inner and outer walls of a protective suit such as that worn by a diver or a flyer. When the wearer desires heat, water is admitted to the exothermic composition within the protective suit in the amount or rate desired and heat is liberated therefrom to suitably warm the wearer. If the composition is spread directly on the object, such as a diver's hands, then the surrounding water will cause the heat generating components of the composition to react and thus liberate sufficient heat to provide warming.

DESCRIPTION OF THE PREFERRED EMBODIMENTS

In order to illustrate the novel compositions of the present invention, the following are examples of specific compositions contemplated by this invention.

EXAMPLE I

| | Percent by weight |
|---|---|
| Aluminum-magnesium alloy | 30.5 |
| Aluminum sulfate (50%) ammonium sulfate mixture | 20.2 |
| Polyethylene glycol | 4.0 |
| Gum arabic | 5.0 |
| Sodium stearate | 0.3 |
| Mineral oil | 40.0 |

The above composition is placed between the inner and outer lining of a protective suit worn by divers, flyers, explorers, etc. When heat is required, water is admitted to the suit in a controlled amount and the resulting exothermic reaction liberates sufficient heat to warm the wearer.

EXAMPLE II

| | Percent by weight |
|---|---|
| Lithium-magnesium alloy | 35.4 |
| Acetic anhydride | 15.2 |
| Polyethylene glycol | 4.0 |
| Gum arabic | 5.0 |
| Sodium oleate | 0.4 |
| Polyoxyethylene sorbitan monooleate (54%), sorbitan monooleate (46%) | 10.0 |
| Mineral oil | 30.0 |

The above cream was introduced into a pair of modified diver's gloves. The gloves were provided with several pieces of rubber tubing which extended over the back of the hand and the wrist area of each glove. A diver wearing such gloves was found to be able to maintain satisfactory hand movement for an unlimited time by employing the heat released from the above composition as water entered the gloves through the rubber tubing.

EXAMPLE III

| | Percent by weight |
|---|---|
| Aluminum-magnesium alloy | 45.0 |
| Acetic anhydride | 17.0 |
| Polyethylene glycol (M.W. 4000) | 1.0 |
| Gum arabic | 6.0 |
| Sodium oleate | 1.0 |
| Mineral oil | 30.0 |

The above composition was introduced into a conventional diver's garment so that upon use, the creamy composition was directly on the skin of the wearer. Water was admitted to the cream composition by flexing the garment which then reacted with the cream to release heat. The glove wearer was able to use his hands comfortably in very cold water.

The foregoing compositions are merely illustrative of compositions which involve the concept of the present invention.

Obviously many modifications and variations of the present invention are possible in the light of the above teachings. It is therefore to be understood that within the scope of the appended claims the invention may be practiced otherwise than as specifically described.

What is claimed is:

1. An exothermic composition for the release of heat to an adjacent body upon the addition of water to the composition comprising:
   (1) 30 to 70% by weight of a heat generating component selected from the group consisting of a lithium-aluminum alloy, a lithium-magnesium alloy, an aluminum-magnesium alloy and powdered aluminum;
   (2) 15.0 to 20.0% by weight of a compound selected from the group consisting of acetic anhydride, aluminum sulfate, ammonium sulfate, ferric sulfate, and ferric ammonium sulfate;
   (3) 0.1 to 6.0% by weight of a polyol having a molecular weight of about 4000;
   (4) 1.0 to 10.0% by weight of gum arabic;
   (5) 0.1 to 2.0% by weight of a surface active agent selected from the group consisting of sodium oleate and sodium stearate;
   (6) an oleaginous material selected from the group consisting of mineral oil and vegetable oil, said oleaginous material being present as the remainder making up the balance of the composition.

2. An exothermic composition for the release of heat to an adjacent body upon the addition of water to the composition comprising:

| Component: | Percent by weight |
|---|---|
| Lithium-magnesium alloy | 35.4 |
| Acetic anhydride | 15.2 |
| Polyethylene glycol | 4.0 |
| Gum arabic | 5.0 |
| Sodium oleate | 0.4 |
| Polyoxyethylene sorbitan monooleate (54%), sorbitan monooleate (46%) | 10.0 |
| Mineral oil | 30.0 |

3. An exothermic composition for the release of heat to an adjacent body upon the addition of water to the composition comprising:

| Component: | Percent by weight |
|---|---|
| Aluminum-magnesium alloy | 45.0 |
| Acetic anhydride | 17.0 |
| Polyethylene glycol (M.W. 4000) | 1.0 |
| Gum arabic | 6.0 |
| Sodium oleate | 1.0 |
| Mineral oil | 30.0 |

4. A method of applying heat to a body subjected to cold environments comprising:

applying to said body an exothermic composition having the following composition:

| Component: | Percent by weight |
|---|---|
| Lithium-magnesium alloy | 35.4 |
| Acetic anhydride | 15.2 |
| Polyethylene glycol | 4.0 |
| Gum arabic | 5.0 |
| Sodium oleate | 0.4 |
| Polyoxyethylene sorbitan monooleate (54%), sorbitan monooleate (46%) | 10.0 |
| Mineral oil | 30.0 | and, supplying controlled amounts of water to the composition to produce heat by reacting therewith.

References Cited

UNITED STATES PATENTS

| 2,953,443 | 9/1960 | Lloyd | 149—37 |
| 3,156,595 | 11/1964 | Camp et al. | 149—87 |
| 3,461,073 | 8/1969 | Crowell et al. | 252—70 |

LEON D. ROSDOL, Primary Examiner

I. GLUCK, Assistant Examiner

U.S. Cl. X.R.

126—263; 149—44, 87; 252—182, 188.3; 424—73, 154, 168, 315